Oct. 27, 1959   R. J. FINN   2,910,201
TIRE CHANGING AID
Filed July 26, 1957
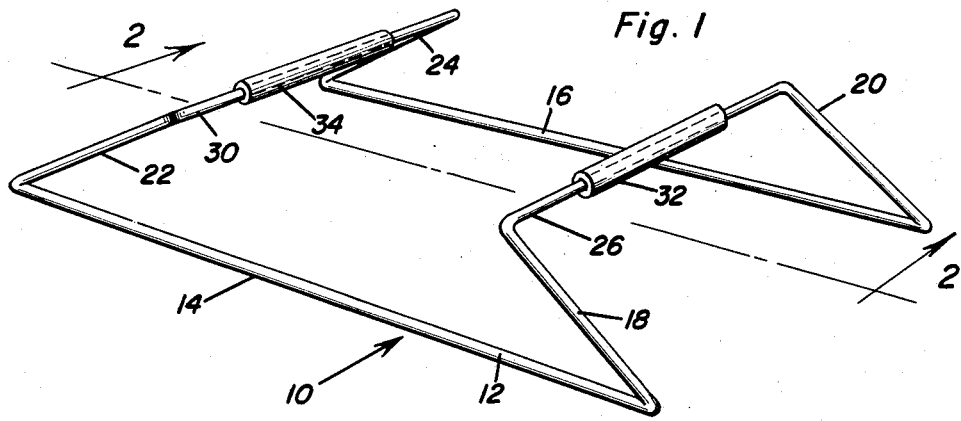
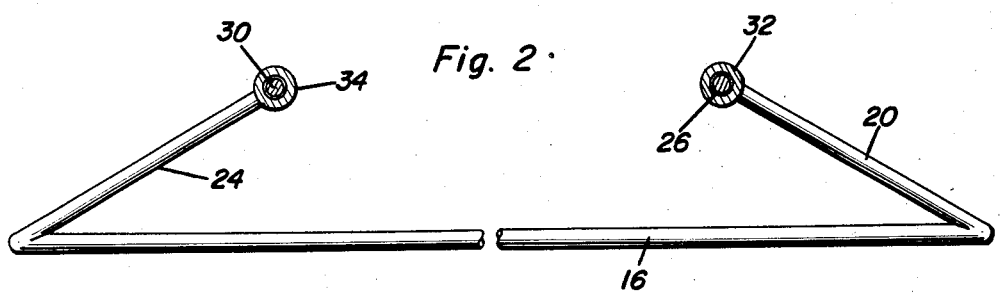
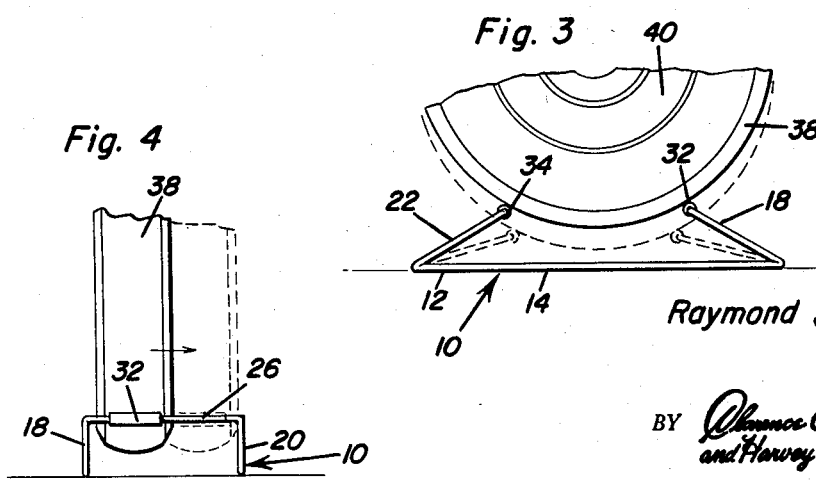
Raymond J. Finn
INVENTOR.

United States Patent Office 2,910,201
Patented Oct. 27, 1959

2,910,201

TIRE CHANGING AID

Raymond J. Finn, Chester, N.Y.

Application July 26, 1957, Serial No. 674,404

5 Claims. (Cl. 214—330)

This invention relates to a device which facilitates the handling of tires for installation or repair purposes.

An object of the present invention is to provide a device on which a tire and wheel is capable of being supported in position for application to a motor vehicle. The arrangement is such that the device supports the tire in a position slightly elevated from the ground but in a yielding manner so that the tire is easily lifted a few inches or depressed a few inches so that the wheel apertures are easily aligned with the hub lugs or with apertures in the hub so that nuts or studs can be applied.

A further object of the present invention is to provide a device for facilitating the installation of a tire and wheel on a motor vehicle, the device having a pair of sleeves which form the cradle on which to support the wheel and tire, the cradle sleeves being slidable toward and away from the motor vehicle so that the tire is positioned in a vertical plane closer or farther from the wheel hub depending on the desires of the mechanic.

A further object of the present invention is to provide a device capable of the previously described functions, the device being mechanically simple so that it is capable of a low production cost. In this way the invention is capable of reaching many users but yet, the function served by the tire changing aid materially reduces labor and effort involved in this job.

Other objects and features of importance will become apparent in following the description of the illustrated form of the invention. In the drawings:

Figure 1 is a perspective view of the tire changing aid device constructed in accordance with the invention;

Figure 2 is a sectional view taken on the line 2—2 of Figure 1;

Figure 3 is an elevational view showing the device in use; and

Figure 4 is an elevational view showing a further use of the device, Figures 3 and 4 illustrating the two different adjustments capable of being attained by a wheel and tire when the tire changing device is in use.

In the accompanying drawing there is shown a tire changing aid device 10 which has a wire frame body 12. The wire frame body has two sides 14 and 16 that are approximately parallel. The ends of the wire frame body are constructed respectively of pairs of sides 18, 20 and 22, 24. Sides 18 and 20 are integrally joined with sides 14 and 16 and are arranged at an acute angle with each. A crossmember 26 is integrally joined to the ends of sides 18 and 20. Sides 22 and 24 are integrally joined to the ends of sides 14 and 16 and they are joined by a cross member 30 which is integral with the ends of sides 22 and 24. Cross members 26 and 30 have sleeves 32 and 34, respectively, disposed slidably and rotatably thereon and movable to the limits that are defined by the sides 18, 20, 22 and 24. Therefore there is a limited range of movement (see Figure 4) through which sleeves 32 and 34 may travel. The cross members 26 and 30 together with sleeves 32 and 34 form a cradle on which the tire 38 of wheel 40 is adapted to seat.

The wire frame is made of suitable metal having enough resiliency to be capable of having the two ends flex (see Figure 3) to a depressed position and again returned to the full line position of Figure 3. This is how the wheel and tire are adjusted as to elevation so that the tire and wheel need not be lifted entirely by the mechanic. In using the device, the wheel and tire is rested on the cradle and more particularly, on the sleeves 32 and 34 thereof. The rise and fall of the wheel and tire are easily achieved by pressing down or lifting up with a much smaller force than would be required to lift and lower the wheel and tire unaided. After the approximate elevation of the wheel and tire is attained, it is slid back toward the motor vehicle hub by having the sleeves 32 and 34 slide on the cross members 26 and 30. Then the lugs or nuts are tightened and the tire and wheel are mounted in this way.

It is understood that various changes and modifications may be made without departing from the invention as claimed below. The materials of construction may vary and the specific configuration may be altered. Moreover, the device may be used in connection with items or devices other than a wheel and tire.

What is claimed as new is as follows:

1. A tire changing device comprising a ground supported frame, end members resiliently mounted on said frame and movable toward and away from the ground, said end members including spaced, parallel horizontally disposed rods overlying the frame and located within the confines thereof, tire engaging sleeves slidable and rotatable on said rods, said sleeves being shorter in length than said rods so that said sleeves may move laterally of the frame along said rods and the tire moving therewith, the resiliency of said members being sufficient to support a tire whereby the vertical height of the tire may be varied by application of a force less than that necessary to support the tire alone.

2. A device for use in supporting and positioning a vehicle wheel on a hub, said device comprising a ground supported frame including a pair of spaced horizontal base members and a pair of inverted U-shaped end members integral with and extending upwardly from the ends of said base members in oblique planes relative thereto, said end members including bight portions extending transversely of the frame, said frame being formed from resiliently yieldable material whereby said end members may be depressed to vary the height of their bight portions above the ground, and a pair of wheel supporting sleeves rotatably and slidably positioned on the bight portions of said end members.

3. The device as defined in claim 2 wherein said frame is formed integrally from a resilient wire rod.

4. The device as defined in claim 2 wherein the end members of said frame extend above said base members at acute angles relative thereto, whereby the distance between the bight portions of the end members is less than the length of the base members.

5. The device as defined in claim 2 wherein said sleeves are substantially shorter than the bight portions of said end members to permit substantial sliding movement of the sleeves from one side of the frame to the other.

References Cited in the file of this patent

UNITED STATES PATENTS

| | | |
|---|---|---|
| 830,010 | Sanders | Sept. 4, 1906 |
| 2,379,587 | Moore | July 3, 1945 |
| 2,441,638 | Laclair | May 18, 1948 |
| 2,471,051 | Tway | May 24, 1949 |
| 2,576,627 | Miner | Nov. 27, 1951 |

FOREIGN PATENTS

| | | |
|---|---|---|
| 320,796 | Great Britain | Oct. 24, 1929 |